UNITED STATES PATENT OFFICE.

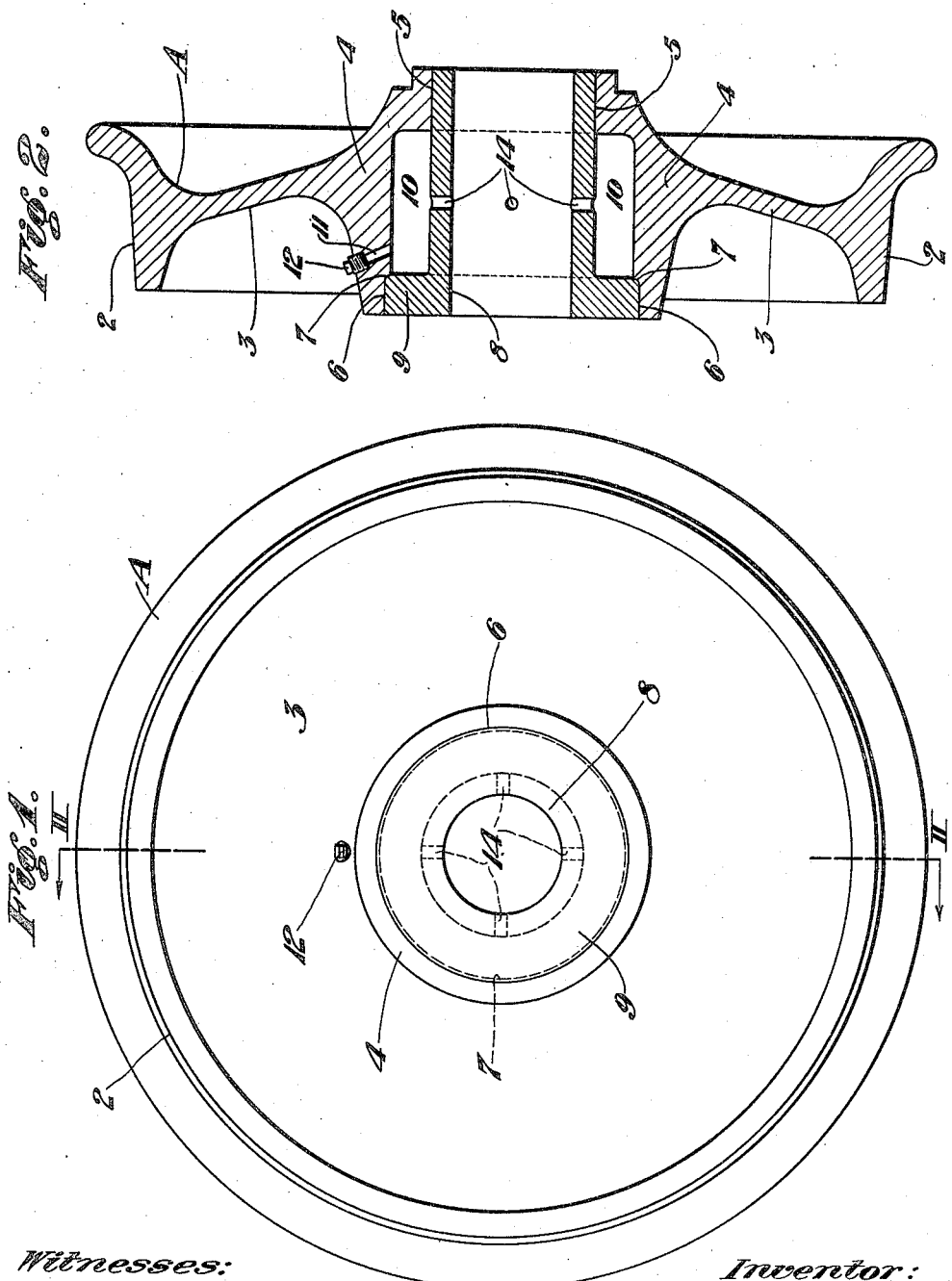

THOMAS WALLEY WILLIAMS, OF PITTSBURGH, PENNSYLVANIA.

CAR WHEEL.

1,423,381. Specification of Letters Patent. Patented July 18, 1922.

Application filed May 12, 1922. Serial No. 560,420.

*To all whom it may concern:*

Be it known that I, THOMAS W. WILLIAMS, a subject of the King of Great Britain, and a resident of Pittsburgh, Allegheny County, Pennsylvania, have invented certain new and useful Improvements in Car Wheels, of which the following is a specification.

This invention relates to car wheels and more particularly to wheels of this type designed for use in mines, and has for its object the provision of a wrought or forged steel wheel having a self-lubricating hub.

A further object is the provision of a wheel of this type having novel means for forming a lubricant retaining receptacle in the hub portion thereof.

A still further object is the provision of a wheel of this type having the novel design, construction, and combination of parts described in the following specification and illustrated in the accompanying drawings, in which—

Figure 1 is a side elevation of a wheel constructed in accordance with this invention.

Figure 2 is a sectional elevation on the line II—II of Figure 1.

Referring more particularly to the drawings, the letter A designates the wrought metal or forged portion of the wheel as a whole, which comprises the usual flanged tread or rim portion 2, a comparatively thin plate or web portion 3, and a relatively heavy hub portion 4.

The hub portion 4 is counterbored from one end nearly to the opposite end, the closed end is then bored to form an aperture 5 of appreciably less diameter than the counterbore, and the opposite end of the counterbored portion is again counterbored for a short distance to form an enlarged portion 6 and a shoulder 7.

A bushing 8 of cast iron or other metal is fitted within the counterbored hub and is of such diameter that it will fit snugly within the bored aperture 5. The opposite end of the bushing from that in the aperture 5 is provided with an annular flange 9 adapted to fit snugly within the enlarged portion 6 of the counterbore and to abut the shoulder 7, thus cooperating with the closed end of the counterbore to form a closed lubricant receiving and retaining chamber or receptacle 10.

A suitable lubricant inlet or oil hole 11 is formed in the hub and is closed by a screw plug 12.

The bushing 8 is shown provided with a series of apertures 14 through its side wall to permit the passage of the lubricant from the chamber or receptacle 10 to the axle of the vehicle upon which the wheel is mounted, although it will be understood that one aperture may be used if desired.

Wheels of this construction will have a much longer life than the old style of cast wheels used on mine cars, will be comparatively cheap to manufacture, will be self-lubricating, and will produce a minimum of friction on the axles due to the unlike metal bushing.

I claim:

In a forged steel car wheel, a hub portion counterbored for the greater portion of its length and having a smaller bored aperture in the bottom wall of said counterbore, said counterbored portion of said hub having an enlarged annular portion at its open end forming a shoulder, and a bushing of a diameter that will fit snugly within said bored aperture fitted within said counterbore and having one end projecting into said bored aperture, an annular flange on the opposite end of said bushing adapted to snugly fit within the enlarged annular portion of said counterbore and abut said shoulder thereby forming a closed annular lubricant retaining recess, said bushing being provided with perforations to permit the passage of lubricant therethrough.

In testimony whereof I have hereunto set my hand.

THOMAS WALLEY WILLIAMS.